United States Patent [19]

Provensal

[11] 4,311,323
[45] Jan. 19, 1982

[54] ADJUSTABLE FIXING DEVICE OF A SAFETY BELT ANCHORING POINT

[75] Inventor: Jacques Provensal, Maurepas, France

[73] Assignee: Regie Nationale des Usines Renault, Boulogne Billancourt, France

[21] Appl. No.: 120,318

[22] Filed: Feb. 11, 1980

[30] Foreign Application Priority Data

Feb. 9, 1979 [FR] France .............................. 79/03328

[51] Int. Cl.³ .......................................... B60R 21/10
[52] U.S. Cl. .................................. 280/801; 280/808; 248/274
[58] Field of Search ............... 280/801, 802, 803, 808; 248/274, 288.1

[56] References Cited

U.S. PATENT DOCUMENTS 3,964,798 6/1976 Burleigh .............................. 280/808

FOREIGN PATENT DOCUMENTS 2249109 2/1974 Fed. Rep. of Germany .
2613654 10/1977 Fed. Rep. of Germany .
2395760 1/1979 France .
1486974 9/1977 United Kingdom .

*Primary Examiner*—Robert R. Song
*Attorney, Agent, or Firm*—Oblon, Fisher, Spivak, McClelland & Maier

[57] ABSTRACT

An adjustable fixing device for attaching a safety belt anchoring point along a support element of a vehicle body and of an emergency release allowing the safety belt, while permitting at least two positions for the anchoring point, including a guide with a mobile anchoring bracket, removable fixing means of the mobile bracket in the interior of the guide and a U-shape control lever permitting the unlocking and shifting of the bracket.

12 Claims, 12 Drawing Figures

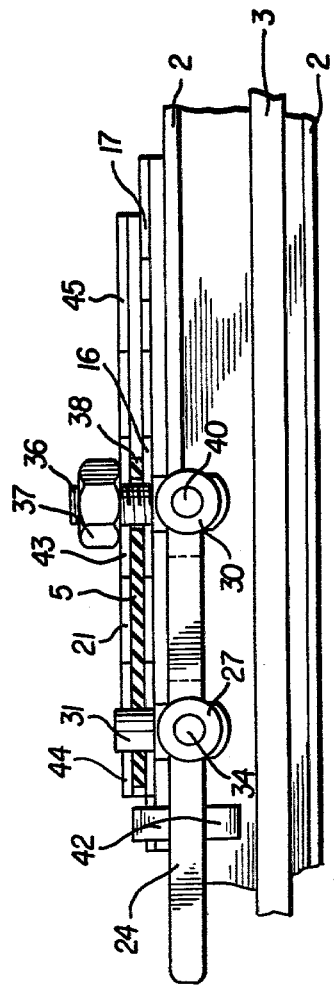
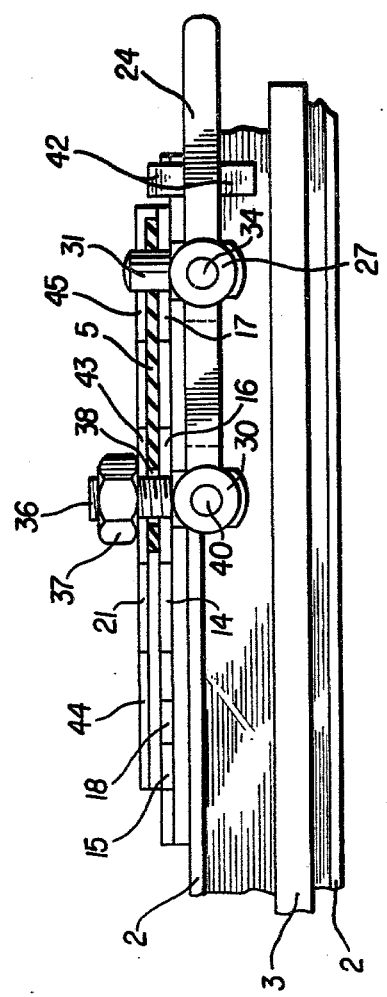
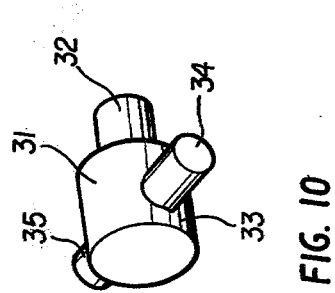

ADJUSTABLE FIXING DEVICE OF A SAFETY BELT ANCHORING POINT

BACKGROUND OF THE INVENTION

1. Field of the Invention

This invention concerns an adjustable fixing device of a safety belt anchoring point along a support element of the vehicle body and of an emergency release of the safety belt, permitting at least two positions for the anchoring point.

2. Description of the Prior Art

The principle of retaining the passenger of a vehicle in case of a front end collision with the help of a diagonal belt or shoulder belt and a stop placed under the side board and forming a catch for the knees is well known and will not be described in detail here. Such a system can easily be made passive (i.e., the retaining device is put into place automatically on the passenger without any action on his part) by hooking the outside point of anchoring the shoulder belt on the frame of the door. Thus, the shoulder belt is released by itself with the opening of the door, permitting the passenger to get out, and also placing itself on the passenger with the closing of the door.

There exist different possibilities of mounting a passive shoulder belt. However, the upper outside anchoring on the door always exists and can either serve the purpose of directly fastening the shoulder belt ending in a metal clamp in case the retracting device of the belt is placed at the center of the vehicle between the seats, or serve the purpose of fastening a return belt in case the retracting device is placed in the door in accordance with known arrangements.

It is also known to provide an adjustable fixing device of safety shoulder belts for motor cars comprising, next to each seat, on the one hand, a vertical strut of rectangular sectional sheet metal fixed on the internal partition of the vehicle body and having a series of openings arranged in rows on its smaller side turned towards the front of the car, and in which the top of the openings is larger than the bottom, and being associated with the upper buckle of the shoulder strap, on which is carried a spike whose end is thickened and which can be fully pushed into the wide part of one of the openings of the vertical strut and then pushed downward in such a way that the thin part is placed into the less wide part of the opening, whose rims then prevent the thickened part of the spike from leaving the strut.

SUMMARY OF THE INVENTION

It is, therefore, an object of the invention to permit the release of a passenger wearing a seat belt after a collision by a person intervening from outside the vehicle. Additionally, another buckle permitting an emergency unbuckling can be arranged inside the vehicle for operation by the passenger, as for example, in the center of the vehicle between the seats in accordance with an arrangement which is well known.

Another object of the invention is to permit the adjustment at two different heights of the high outside anchoring point of the passive shoulder strap in order to increase the efficiency of the retaining power of passengers of different size and in order to increase the wearing comfort of the shoulder strap in case of passengers of different size.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein:

FIG. 10 is a perspective view of a smooth pin with a slightly conical end;

FIG. 11 is a representation, in a lateral side view, of the device according to the invention in which the lever in the form of a U is shown in the low position; and FIG. 12 is a representation, in a lateral side view, of the device according to the invention in which the lever in the form of a U is shown in the top position.

DETAILED DESCRIPTION OF THE PREFERRED EMBODIMENTS

Figure 1:
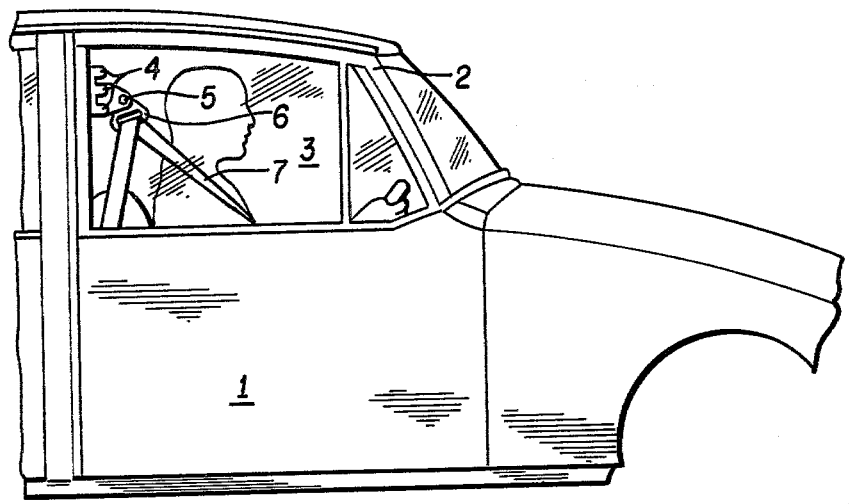
FIG. 1 is a partial view in elevation of a vehicle equipped with an anchoring bracket and a safety belt.

In the drawings, wherein like reference numerals indicate like parts throughout the several views, FIG. 1 represents a lateral partial view of a vehicle having a door 1, a window frame or upper door frame 2, a window glass 3 and an anchoring bracket 4 fixed on the door frame 2 through known means, such as welding, for example. A mobile bracket 5 carries nuts, and a return 6 of the strap 7, representing the passive shoulder strap in the case when the strap retracting device is located in the door. However, the invention is applicable as well in case the retracting device is located in the vehicle, the strap return 6 then being replaced by a metal clamp retaining the end of the strap 7.

Figure 2:
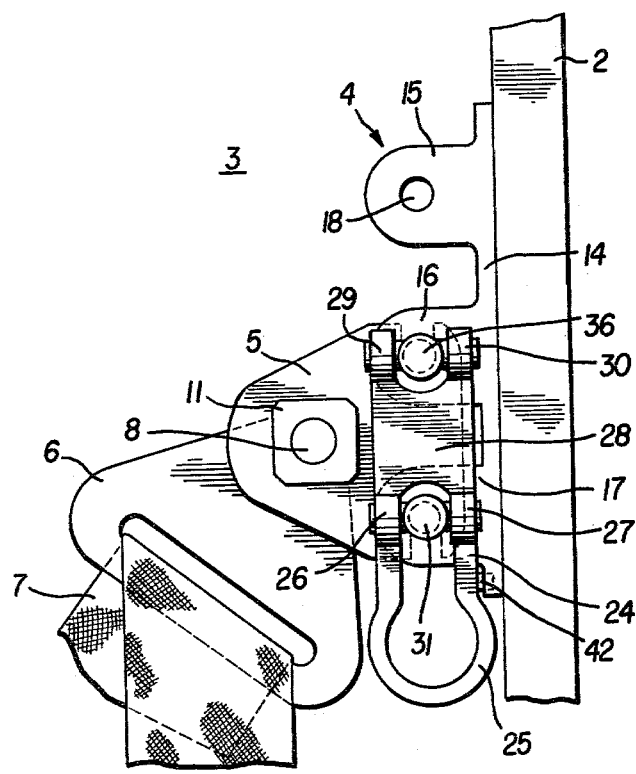
FIG. 2 is a fragmentary front view of the device according to the invention as seen from the exterior side of the vehicle.
Figure 3:
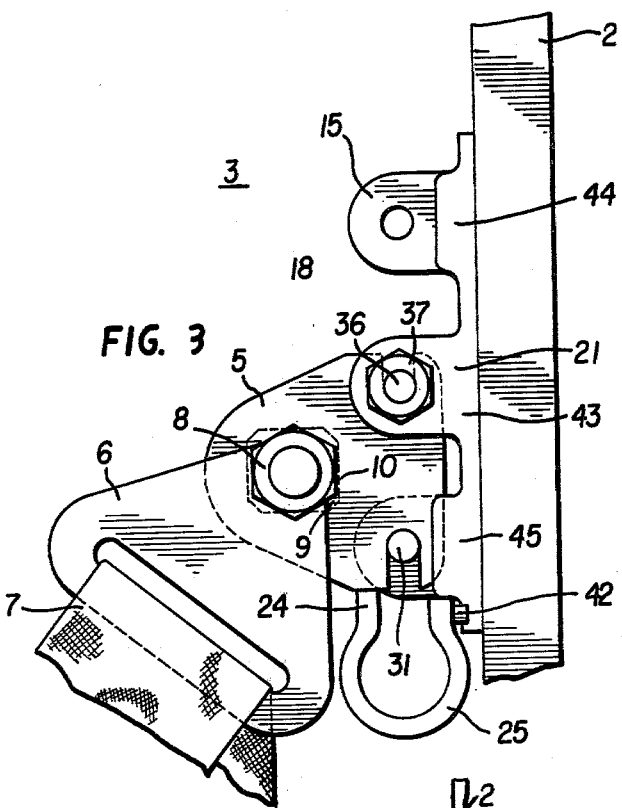
FIG. 3 is a back view of the device according to the invention as seen from the interior side of the vehicle.
Figure 4:
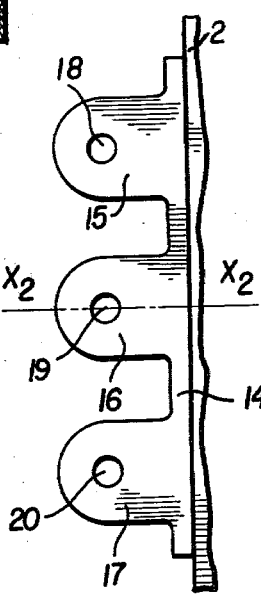
FIG. 4 is a front view of the mobile anchoring bracket.

According to the representations of FIGS. 2 and 3, the strap return 6 is fixed on the mobile bracket 5 by bolt 8 and nut 11 with the help of two cross pieces 9 and 10 preferably of plastic material. The nut 11 is welded on the mobile bracket 5. The mobile bracket 5, which is shown alone in FIG. 4, is provided with two oblong open holes 12 and 13 forming a fork at its upper rear part as well as at its lower rear part. The stationary bracket 4 is fixed on the upper frame of the door 2 by welding, for example. It consists of an outside indented plate 14 (FIG. 5) with three projections 15, 16, 17 each pierced by a hole 18, 19, 20 and an inside plate 21 (FIG. 6) comprising a single central projection 43 pierced by a hole 22 opposite hole 19 of the central projection 16 of the outside indented plate 14. The inner plate 21 comprises additionally two truncated projections 44 and 45 opposite the respective projections 15 and 17 of the outside indented plate 14.

Figure 5:
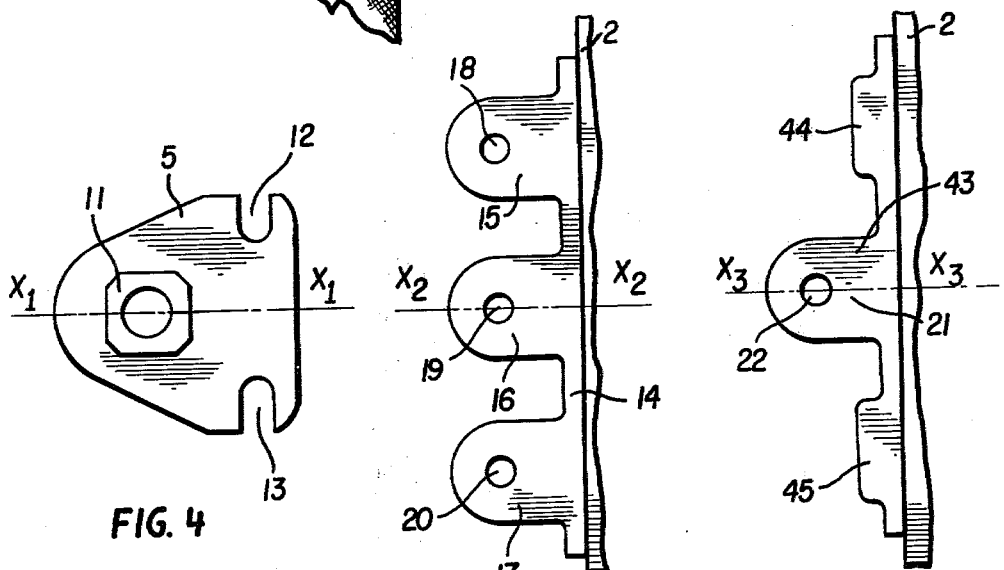
FIGS. 5 and 6 represent, from the front, the two constituent parts of the stationary anchoring bracket on the vehicle body.
Figure 6:
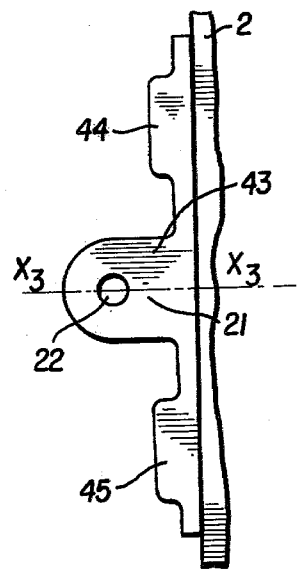
Figure 7:
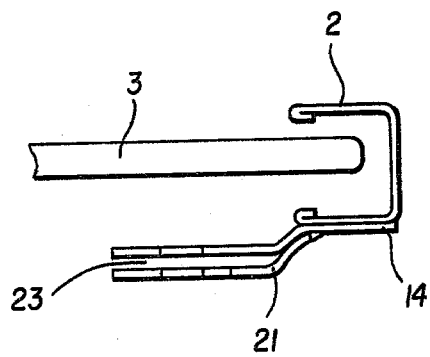
FIG. 7 is a view from above the stationary anchoring bracket.

FIG. 7, which is a view of the top of the stationary bracket 14, shows clearly the fixing method of the inside plate 21 on the indented outside plate 14, for example, by welding with the groove 23 formed between said outside plate 14 and inside plate 21. The mobile bracket 5, illustrated in FIG. 4, is symmetrical in relation to the axis $X_1X_1$; and the outside indented plate 14, illustrated in FIG. 5, is symmetrical in relation to the axis $X_2X_2$. The inside plate 21, illustrated in FIG. 6, is symmetrical in relation to the axis $X_3X_3$.

Figure 8:
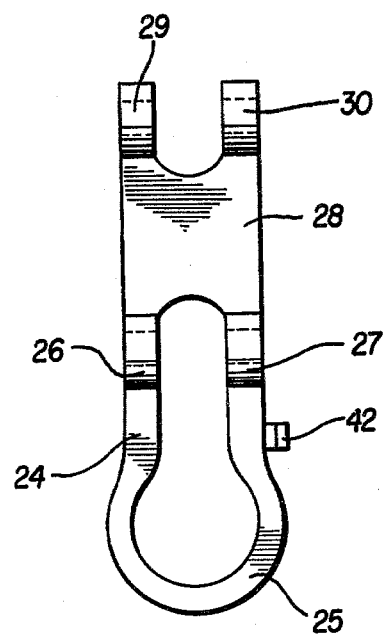
FIG. 8 is a view from above of a lever in the form of a U.
Figure 9:
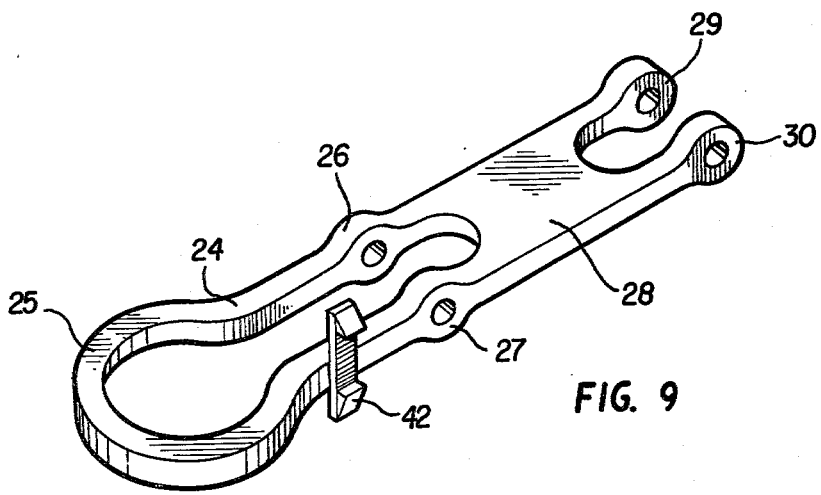
FIG. 9 is a perspective view of the lever in the form of a U.

The device has, furthermore, a lever 24 in the form of a U represented in FIGS. 8 and 9 in a lateral view from outside the vehicle, and in a general perspective, respectively. The lever in U form 24 is dimensioned in such a manner that it is easy to pass a finger through the buckle 25 of the U so as to easily operate lever 24.

Above the buckle 25 of the lever 24, the two branches of the U are expanded in thickness so as to obtain sufficient space for two holes 26 and 27. Above said expansions, the two branches of the lever 24 are reunited by a small plate 28 which is fixed permanently, for example, by welding. Finally, above the plate 28, the two branches of the lever 24 are again expanded in thickness according to the same arrangement as before in order to obtain sufficient space for two holes 29 and 30.

Finally, the lever 24 is provided with a small elastic tongue 42, for example, at its lower part, having the purpose of maintaining the lever in place when the system is in normal position. Quite obviously, other methods can be used to keep it in its position, such as a snap-in and snap-out system requiring a slight effort without being outside the framework of the invention.

The device uses also a lower pin 31 represented in perspective in FIG. 10. This pin 31 consists of a preferably conical end 32 and a head 33 provided with two cylindrical lugs 34 and 35 having a diameter so as to be able to engage in the holes 26 and 27 of the lever 24 with a slight play.

The device comprises, finally, a threaded pin 36, FIG. 11, on which a standard retaining nut 37 and a round crosspiece 38, preferably of plastic material, can be placed. The pin 36 has also a head 39 similar to that of the pin 31 and having two cylindrical lugs 40 and 41 provided so as to be engaged in the holes 29 and 30 of the lever 24.

In the assembly position of the device in the lower anchoring position (FIG. 11), the pins 31 and 36 are engaged, with the help of their cylindrical lugs 34, 35, 40, 41, respectively, in the holes 26, 27 at the base of the lever 24 and in the holes 29 and 30 at the upper part of the lever 24. The threaded pin 36 is then placed into the hole 19 of the central projection 16 of the outside plate 14 of the stationary anchoring bracket 4. The round crosspiece 38 is inserted on the pin 36 between the outside plate 14 and the inside plate 21 of the stationary anchoring bracket 4. The threaded pin 36 is placed into the hole 22 of the inside plate 21, and the unit is completed and tightened with the help of the retaining nut 37.

The mobile bracket 5, after having assembled on it the strap return 6 provided with its strap 7, with the help of the screw 8, with the crosspiece 9 and 10 and with the welded nut 11, is placed into the groove 23 between the outside plate 14 and the inside plate 21 by a movement from the bottom up. This movement is continued until the fork 12 of the mobile bracket 5 surrounds the threaded pin 36 and its round crosspiece 38. Now the fork 13 of the mobile bracket 5 is placed opposite the hole 20 of the lower projection 17 of the indented outside plate 14. The lever 24 is then turned downward by rotating it around the cylindrical lugs 40 and 41 of the pin 36. In the course of this rotation, the pin 31 which can also pivot in relation to the lever 24, owing to the lugs 34 and 35, engages in the hole 20 of the lower projection 17 and in the fork 13 of the mobile bracket 5.

The slight conical shape 32 of the end of the pin 31 is effected in such a way that the driving of the pin 31 into the hole 20 and the fork 13 can be done with a slight effort, but a good hold is assured without play of the mobile bracket 5 in relation to the indented outside plate 14.

Finally, the rotation of the lever 24 towards the bottom is continued until the tongue 42 catches on the indented outside part 14. This catch has been conceived in order to maintain easily the closing of the lever 24 under normal conditions of the utilization of the vehicle without, however, requiring too great an effort for the release when effecting the modification of the position of the anchoring or when effecting unbuckling in an emergency by a person intervening from the outside.

In FIG. 11, which represents the device seen from the front of the vehicle, the return 6 the strap 7, the screw 8, the crosspieces 9 and 10 as well as the nut 11 have been omitted for reasons of clarity.

When the device is in its low anchoring position as represented in FIG. 11 and is to be placed into its high anchoring position as represented in FIG. 12, the lever 24 is released by eliminating the locking effected by the tongue 42. The lever is pulled upward (down as depicted in FIG. 11) by turning it around the cylindrical lugs 40 and 41 of the pin 36. By doing this, the conical pin 31 is released from the fork 13 of the mobile bracket 5 and the hole 20 of the lower projection 17 of the indented outside plate 14. This release is facilitated by the conical shape of the pin 31 as well as by the effect of the lever which is made available by the rotation of the lever 24 around the lugs of the pin 36. It is then possible to slide the mobile bracket 5 downward until the fork 12 of the mobile bracket 5 is fully disengaged with the pin 36.

The released mobile bracket 5 is again engaged by a movement from the top downward in the groove 23 between the outside plate 14 and the inside plate 21. This movement is continued until the fork 13 of the mobile bracket 5 surrounds the threaded pin 36 and its round crosspiece 38. Then, the fork 12 of the mobile bracket is placed opposite the hole 18 of the upper projection 15 of the indented outside part 14. The lever is now turned upward (down as depicted in FIG. 12) by rotating it around the cylindrical lugs 40 and 41 of the pin 36. In the course of this rotation, the pin 31, which has before been oriented in an inverse fashion to the position which it previously occupied by the rotation around the lugs 34 and 35, is engaged in the hole 18 of the upper projection 15 and in the fork 12 of the mobile bracket 5. The above made remarks concerning the conical shape of the pin 31 are, quite obviously, applicable in the case of the high position of the anchoring. The upward rotation of the lever 24 is continued until the tongue 42 catches on the indented outside plate 14. The device with the anchoring in the high position is presented in FIG. 12, seen from the front of the vehicle.

It is quite obvious that, if the preferred form of the implemented device according to the invention is applicable to a high outside anchoring point, it is within the possibilities of a person having ordinary skill in the art to extend the application of the device according to the invention to a longitudinal anchoring, for example in the center of the vehicle between the seats.

The modification of the position into the high anchoring position or into the low anchoring position can, of course, be effected as many times as it is necessary in order to adapt the position of the anchoring to the size of the passenger. In case of a collision and in case the passenger could not unbuckle himself from his passive shoulder strap, it is possible to release the high anchoring of the shoulder strap with the help of the device just described by a person intervening from the outside. This device, located on the frame of the door, is, indeed, easily accessible by a person outside the vehicle.

When the anchoring is in its low position, the outside intervening person, after having eliminated the lateral glass, must only pull the lever 24 upward (down as depicted in FIG. 11), thus moving the locking effected by the tongue 42. The lever 24 pivots around the cylindrical lugs 40 and 41 of the pin 36, disengaging in this way the conical pin 31 from the fork 13 of the mobile bracket 5 and the hole 20 of the lower projection 17 of the indented outside plate 14. This disengagement is facilitated by the conical shape of the pin 31 as well as by the effect of the lever which is produced by the rotation of the lever 24 around the lugs 40 and 41 of the pin 36. It is then possible to slide the mobile bracket 5 downward whereby the belt is released.

When the anchoring is in its high position, the outside intervening person, after having eliminated the lateral glass, must only pull the lever 24 downward (up as depicted in FIG. 12), thus removing the locking effected by the tongue 42. The lever 24 pivots around the cylindrical lugs 40 and 41 of the pin 36, disengaging in this way the conical pin 31 from the fork 12 of the mobile bracket 5 and the hole 18 of the upper projection 15 of the indented outside plate 14. This disengagement is facilited by the conical shape of the pin 31 as well as by the effect of the lever which is produced by the rotation of the lever 24 around the lugs 40 and 41 of the pin 36. It is then possible to slide the mobile bracket 5 upward, whereby the belt is released.

It will be noted that it is possible to use the plate 28 which unites the two branches of the U of the lever 24 to carry short instructions concerning the operation of the lever 24. Therefore, when the lever is towards the top in the high anchoring position, the visible surface of the plate 28 would carry the words "pull downward" while, when the lever is towards the bottom in the low anchoring position, the visible surface of the plate 28 would carry the words "pull upward."

What is claimed as new and intended to be covered by Letters Patent is:

1. An adjustable fixing device for attaching a safety belt anchoring point at a support element of a vehicle body permitting at least two positions for the anchoring point and for allowing an emergency release of the safety belt, said adjustable fixing device comprising:
   a guide formed by a pair of spaced apart members;
   a mobile anchoring bracket releasably fixed to said guide;
   removable fixing means disposed between said spaced apart members; and
   a U-shaped control lever connected with the bracket and said fixing means for releasing and shifting the bracket in the guide.

2. An adjustable fixing device according to claim 1, wherein the guide comprises an outside plate and an inside plate having a groove between said plates in which said mobile anchoring bracket slides.

3. An adjustable fixing device according to claim 2, wherein said outside plate has at least three projections including a central projection, and each projection is pierced by a hole.

4. An adjustable fixing device according to claim 3, wherein said inside plate has a central projection pierced by a hole opposite the central projection of the outside plate.

5. An adjustable fixing device according to claims 3 or 4, wherein said mobile bracket, said outside plate and said inside plate each are symmetric about an axis.

6. An adjustable fixing device according to claim 1, said bracket further comprising:
   a fixing nut for attaching a safety belt return; and
   two open forks on both sides of said bracket for releasably fixing said bracket to said guide.

7. An adjustable fixing device according to claim 1, wherein said U-shaped control lever further comprises:
   a buckle at one end of said lever, said buckle of such a dimension that a person can pass a finger through said buckle;
   four enlargements at another end of said lever; and
   each enlargement being pierced by a transverse hole.

8. An adjustable fixing device according to claim 7, wherein said control lever includes a central plate portion uniting the two branches of the U-shaped lever.

9. An adjustable fixing device according to claim 7, wherein said control lever has a catch-like device consisting of an elastic tongue.

10. An adjustable fixing device according to claim 1, wherein at least one of the removable fixing means has a threaded pin with a head which carries two cylindrical lugs for engaging with said U-shaped lever.

11. An adjustable fixing device according to claim 1, wherein at least one of the removable fixing means has a smooth pin with a slightly conical end and a head with two cylindrical lugs for engaging with said U-shaped lever.

12. An adjustable fixing device for attaching a safety belt anchoring point at a support element of a vehicle body permitting at least two positions for anchoring and for allowing emergency release of the safety belt, said adjustable fixing device comprising:
   a stationary guide formed by a pair of parallel, spaced apart members wherein the guide comprises an outside plate and an inside plate having a groove between said plates;
   a mobile anchoring bracket releasably fixed to said guide in said groove between said plates;
   first and second removable fixing means disposed between said spaced apart plate members and releasably fixing said mobile anchoring bracket to said stationary guide; and
   a U-shaped control lever operably connected with said mobile bracket by the removable fixing means for emergency releasing and for shifting the anchoring point of the mobile bracket on said guide.

* * * * *